Patented June 23, 1936

2,045,006

UNITED STATES PATENT OFFICE 2,045,006

PIGMENTED PAINTS, VARNISHES, AND LACQUERS, AND MANUFACTURE OF SAME

William Bryan Wiegand, Sound Beach, Conn., assignor to Binney & Smith Company, New York, N. Y., a corporation of New Jersey No Drawing. Application September 23, 1932, Serial No. 634,563

9 Claims. (Cl. 134—58)

My invention relates to improvements in the manufacture of paints, varnishes, lacquers and the like. My invention relates particularly to an improved process for securing relatively complete and permanent colloidal dispersion of a pigment within a dispersion medium, namely the vehicle of the paint, varnish or lacquer. My invention also includes the products of my new process.

Briefly, my improved process consists of two distinct steps or operations in combination, namely an initial step in which the vehicle or dispersion medium is coalesced, agglomerated, agglutinated or massed with the respective pigments or combination of pigments which initial treatment may be effected under conditions most favorable to ready mixing and either with or without the application of high-shearing stresses; followed by a second step characterized by the circumstance that the mass resulting from the initial step or operation is subjected to unusually high shearing stresses, these high shearing stresses being obtained by subjecting the mass while in a state of relatively stiff consistency to vigorous mechanical manipulation, as hereinafter described.

Several expressions are frequently employed herein. First, I have used the expressions "media" or "paint media" to signify the various dispersion media or vehicles commonly employed in the paint, varnish and lacquer industries, such as linseed oil, China-wood oil, nitrocotton (pyroxylin), resins of all kinds whether natural or synthetic, phenol-formaldehyde condensation products, chlorinated rubber or rubber-like substances such as the reaction products of ethylene di-chloride and polysulphide, and the like. In all cases it is to be understood that by the expressions "media" or "paint media", I refer to the continuous phase of a paint, varnish, lacquer or the like, the primary function of which is to form a film for the protection of underlying surfaces and further the expression "paint" as used herein is to be interpreted as embracing not only paints in the strict sense but also varnishes, lacquers, enamels and the like.

Also, I have used the word "pigment" to signify the discrete or "inside" phase, for example, the powders such as carbon black, zinc oxide, iron oxide, titanium oxide and the like commonly used in the paint industry, and also including organic substances such as dyes, toners, lakes, and the like.

Existing processes for the dispersion of pigments in paint media include a range of mechanical treatments such as agitation in simple containers, agitation by means of stirring devices, paddles, et cetera, agitation in so-called ball mills, stone mills, or pebble mills, or the grinding of the pigment phase in the medium on roller mills, or the like.

All of such existing means of dispersing pigments in paint vehicles or media are characterized by the absence of conditions producing high shearing stresses in the substances being mixed. In practically all cases the paint medium is reduced with solvents, solvent plasticizers or non-solvent plasticizers, resins, or the like to a condition of liquidity. This liquidity may vary from a relatively fluid condition, as in the case of ball or pebble mill grinding, to a more highly viscous condition as in the case of roller mill, and in stone mill grinding, but in none of the existing processes is the mass subjected to the high shearing stresses necessary to accomplish the high degree of dipersion obtained by my improved process.

I have discovered that an unusually high degree of dispersion of pigments in paint media is effected by subjecting a preliminary mixture or agglutination of these materials to a strenuous mechanical manipulation while the mass is in a condition of unusually stiff consistency.

I shall now describe in detail my improved two-step process for pigment dispersion. The initial step of my process is that of coalescing, agglomerating, agglutinating or massing the pigment with the medium. This may be effected by any one of the several methods with which the art is familiar. One method for example, is to combine the pigment and medium in an internal mixing machine such as a so-called dough mixer which is enclosed and within which enclosure are mounted paddles, rotors, screws, or other moving members which cause an intimate admixing of the various ingredients. Another method of obtaining this first stage of dispersion is feeding the pigment and the medium together thru a roller mill of the type commonly used in the rubber industry. These mills consist essentially of two or more relatively closely spaced, power driven, parallel rolls with their axis of rotation in a substantially horizontal plane. The materials are fed onto the upper surfaces of the rolls and as said rolls rotate these materials are ground together between the roll surfaces. Such part of the ingredients as may not immediately be taken up by the medium is caught in a receptacle beneath the rolls and may be repeatedly passed thru the mill if necessary until agglutination or massing or the desired degree of mixing is obtained. The mass adhering to the rolls may be repeatedly passed thru the cap or "bite" between said rolls either alone or together with other materials, being fed therethru until agglutination or the desired degree of mixing is obtained or until it has reached the required consistency for the second step of my process as described below. I claim no novelty for this treatment in itself. It is merely the preliminary although essential step of the process of my invention which consists in the combination of two distinct steps or operations.

The incompletely dispersed mixture from this initial operation is now passed either with or without modifications to the second step or operation of my process. The primary function of this second step is to subject the associated or agglutinated mass of pigment and medium to high shearing stresses so as to effect a high degree of dispersion of the pigment in the medium. A prerequisite for this operation is that the said mass shall exhibit, while being subjected to this treatment, an unusually stiff consistency. I have found that the best results are obtained when the mass being treated has the physical properties of a highly-viscous plastic of leather-like consistency, such that if the mass were rolled into sheets of corresponding thickness, these sheets would exhibit the general physical texture or consistency of sole leather. If the mass resulting from the initial step of my process does not already have this desired consistency, it is necessary to modify its condition either before or while subjecting it to this second operation. To this end special preparatory measures may be necessary. Where linseed oil or other like oil media is used, the temperature at which this second step is carried out may, for example, be lowered to the point where these oil-pigment mixtures exhibit the required consistency or stiffness. In the case of media which, at ordinary temperatures, are so solid, stiff or hard, as to be unworkable, the temperature may be raised to the point where the material is workable or plastic, at the same time, however, retaining this leather-like consistency. In the case of media which consists of mixtures of several components, some of which are thinly liquid and others relatively viscous semi-solids or solids, I may leave out a part or even all of one or more of the thinly liquid components in order to have available for this second step of my process a mass of the desired consistency. Thus after the first step of my process has been completed, it may be necessary to either lower or raise the temperature of the mass or to remove certain volatile liquid ingredients, or to add such ingredients to the mass before passing it to this second step, namely that of applying high shearing stresses, or else so modify the mass during this second operation.

I will now describe various means for carrying out this second step of my process. The associated mass from the initial operation either with or without modification but necessarily in the above described condition of stiff consistency may be forced or extruded thru what is known in the art as a strainer. This strainer may contain one or more layers of strong wire mesh which may be either open mesh as, for example, one quarter inch opening; or a very fine mesh as, for example, one tenth, one twentieth, or one hundredth of an inch opening. By means of a feeding hopper, an endless screw impeller and a surrounding housing the material is fed into this strainer and forced, under considerable pressure, thru the interstices in the screen. As this stiff material is forced thru these interstices, the screen wire tends to hold it back and a relatively high shearing stress is thus applied to each small element of the mixture as it is forced thru the screen. The smaller the mesh of the screen the smaller are these elements which pass thru it and the greater the relative shearing stress.

I claim no novelty for this process of straining or screening as such. It is and has long been very successfully employed, for example, in the reclaimed rubber industry where the material is regularly purified and homogenized by passing at high pressure thru such a strainer. But, so far as I am aware, I am the first to discover the advantages derived from the use of these strainers in the manufacture of paints, lacquers and the like under conditions above described.

The use of the screen or strainer under conditions described herein is particularly effective in attaining the end of my invention; namely that of obtaining high shearing stresses. As the material issues from each of the interstices of the screen it is apparently subjected to a sudden expansive movement in all directions simultaneously, this being due to the pressure behind the material imposed by the screw impeller. The result of this is an intense shearing action which serves markedly to enhance the dispersion or intimate mixing of the pigment with the medium. Improved dispersion is obtained by passing the material only once thru the strainer if the interstices are sufficiently small but usually I find that a higher degree of dispersion and a consequently further improved product is obtained by passing the materials several times thru the screen or alternatively by passing the material thru several thicknesses of screening in succession. The necessary amount of straining will vary somewhat with different mixtures being treated. In case the materials which are to be passed thru the strainer display insufficient stiffness at their existing temperature, they may be refrigerated or chilled during the operation of extrusion or straining, thus attaining the desired consistency conducive to the optimum functioning of this second step of my process.

Another method of attaining the high shearing stresses essential to the second step of my process is as follows: The material from the initial step is fed onto roller mills, such as previously described, and maintained at a temperature conducive to stiff consistency of the particular mixture being treated. If the material, for example, is too hard or too stiff the rolls are heated with steam or by other means to a point where the material will cohere sufficiently to avoid crumbling or fracturing when passed thru the rolls. If the material is too limpid, that is to say shows too soft a consistency, the roller mills may be chilled or refrigerated by means of ice water, ammonia, or the like, in order to increase the stiffness of the material to a point where high shearing stresses may be imposed, as above described.

The adjustment and rotation of the rolls of the mill are so arranged as to enhance the shearing stresses applied to the material. One way of doing this is to drive the rollers of the roller mill at differential speeds, one roller of a pair having a circumferential velocity greater than the other so that the relative motions of the surfaces of the rollers in contact with the material being treated, increase the shearing stresses exerted on the materials passing between them. This so-called friction ratio may be adjusted at will by the use of gear reduction or by the use of variable speed motors, or the like. I have found a ratio of 1¼ to 1 with the slower roll operating at about 24 R. P. M. to be very effective.

Another way in which I may enhance the shearing stress is thru the very close juxtaposition of the mill rolls for instance, one sixteenth inch or less. When carefully ground and suitably chilled the rolls may be adjusted so closely together as to deliver a sheet of material of exceeding thinness. I find that the more closely the rolls are thus held together and consequently the thinner the sheets of the material as it leaves the roller mills, the greater is the shearing stress obtained and so also the greater is the degree of perfection of dispersion of the pigment in the medium.

In practice, in order to obtain the necessary high shearing stresses, I may employ two or more of these devices in unison. Thus I may circulate cold water thru the roller mills, adjust the rolls to a differential speed, and hold the rolls very close together as the milling proceeds.

As a specific illustration of my invention: 8.3 pounds of half second nitrocotton (A. S. T. M. method) containing 30% alcohol was fed together with one pound of high color carbon black into an enclosed or so-called internal mixing machine or dough mixer, of the type previously described. The door of the mixer was closed and the mixer allowed to run for fifteen minutes. At the end of this time the nitrocotton and carbon black had coalesced or become mixed to the extent of cohering in a single mass or series of masses. A sample of this mass was then dissolved in a solvent vehicle, butyl acetate being used in this instance, and produced a lacquer which was found to be imperfect as to color, gloss and covering power, indicating an incomplete degree of dispersion of the pigment in the medium.

The mass resulting from this initial operation was then placed on a two-roll rubber mill of the type above described, operating at a differential speed as between the front and rear rolls of about 1¼ to 1 and the rolls so adjusted that the sheet of material passing from between them was not over one thirty-secondth inch in thickness. The condition of the mass while being subjected to this second operation of my process was that of a highly viscous plastic of leather-like consistency. It was, however, sufficiently soft to be readily workable, to avoid crumbling and to adhere to the roller surface. The sheet adhering to the roll was repeatedly passed thru the "bite" or gap between the rolls for about five minutes, the slower roller revolving about 24 R. P. M. The sheet was then stripped from the roll and a sample of it dissolved in butyl acetate as the solvent vehicle. The lacquer so produced exhibited a markedly improved color, gloss, tone, covering power and resistance to weathering, indicating a high degree of dispersion. The above illustrates the two steps of the process of my invention in its simplest form.

In order to facilitate the initial step or operation, that of massing the ingredients, a small amount of butyl acetate was added. However, to obtain the proper consistency for the condition of high shearing stress it was necessary to allow the solvent to evaporate, at least in part, before subjecting the mass to the second step or tight milling operation. In the present case this evaporation was effected naturally, that is by leaving the mass open to the atmosphere for a relatively short time interval. The same result can be obtained however, by subjecting the mass to mild mechanical agitation while exposed to the atmosphere such as a short intermediate milling operation prior to the tight milling operation just described. By thus allowing the solvent to evaporate between the two operations the stiffness of the material was increased, before being subjected to the second step of the process, to that most favorable to the high shearing stresses which I have found result in a more nearly perfect dispersion of the pigment in the medium and consequently an improved quality of the product.

As a second illustration of my invention: 1000 grams of synthetic resin of the phenol-formaldehyde condensation type was mixed with 500 grams of carbon black on a two-roll rubber mill of the type previously described. I then added to this mixture 500 grams of a substance known to the art as "ester gum". These materials were run together through the mill until agglutination and approximate homogeneity was attained. During this initial or preliminary mixing operation the mill rolls were spaced apart about ¼ inch. The resulting product from this initial operation was then passed to a second roller mill, the rolls of which were run at differential speeds of about 1¼ to 1 ratio, the slower roll operating at about 24 R. P. M. and set not over one thirty-secondth inch apart. Also cold water was circulated thru both rolls of the mill as described above, in order to lower the temperature of the mass being treated to a point where it exhibited the necessary leather-like consistency. This second milling operation was continued for several minutes. A sample of this product dissolved in butyl acetate as the solvent vehicle produced a lacquer of pronounced superiority as to pigment dispersion as indicated by gloss, tone, covering power and the like.

The above procedure may be varied within rather wide limits. For example, the medium may contain all or part of the various oils and resins, et cetera, which are used in the ultimate formula of the paint, varnish or lacquer. The determination as to which of the various media are to be added or omitted at this stage is based upon the effect of the particular medium on the consistency of the mix. For the initial or associating operation a relatively lower viscosity is usually preferable, for the reason that such viscosities are usually more favorable to ready mixing or agglutinating of the pigment with the medium at this stage.

As regards the pigment phase this may be added all at one time or each pigment may be added separately in accordance with the best results for the case in point. I do not limit myself to any one group of ingredients or any one type of paint or lacquer formula. Whether all of the ingredients required by the formula are added prior to the completion of my process or whether some are left out and added afterwards, depends entirely upon whether the resulting consistency of the mixture would be sufficiently stiff to effect the necessary high shearing stress when subjected to the second step of my process.

It is to be understood that my invention does not contemplate the use of either step or operation of the process without the other. If I use only the first or agglomerating operation I do not get the desired degree or permanence of dispersion of pigment in the medium. If I seek to employ only the second step of my process without preceding it by the initial step, I have found that a greatly prolonged period of processing is required to obtain the necessary degree of dispersion of the pigment in the medium and in some cases the characteristics of the medium are such that homogenization or agglutination is practically impossible. Thus, both for economic operation and high quality of the resultant product, I have found the desired results to be obtainable only by the combination, in succession, of the two steps of my process as described herein.

I claim:

1. The process for dispersing pigment in "media" comprising an initial step of agglutinating or massing the pigment with the "media" followed by a second step involving the subjection of the mass from the initial step to vigorous mechanical manipulation while in the condition of a highly viscous plastic of "leather-like" consistency.

2. The process for dispersing pigment in "media" comprising an initial step of agglutinating or massing the pigment with the "media" followed by a second step involving the subjection of the mass from the initial step to vigorous mechanical manipulation while in the condition of a highly viscous plastic of "leather-like" consistency, the initial agglutinating or massing step being effected under conditions of lower viscosity.

3. The process of dispersing pigment in "media" comprising an initial step of agglutinating or massing the pigment with the "media" followed by a second step involving the forcing of the mass from the initial step thru a strainer while in the condition of a highly viscous plastic of "leather-like" consistency.

4. The process of dispersing pigment in "media" comprising an initial step of agglutinating or massing the pigment with the "media" followed by a second step involving the subjection of the mass from the initial step to a milling operation while in the condition of a highly viscous plastic of "leather-like" consistency.

5. The process of dispersing pigment in "media" comprising an initial step of agglutinating or massing the pigment with the "media" followed by a second step involving the passing of the mass from the initial step while in the condition of a highly viscous plastic of "leather-like" consistency thru a roller mill, the rolls of which are spaced apart not more than $\frac{1}{16}$" and operated at differential speeds.

6. In the process of dispersing pigments, the following steps: agglutinating the pigment with a "medium" and subjecting the resulting mass to vigorous mechanical manipulation while so controlling the temperature of the mass that it will be in the condition of a highly viscous plastic of "leather-like" consistency and continuing such manipulation until an apparently homogeneous mass is obtained and the pigment aggregates are broken down sufficiently so that if the "medium" is dissolved in a solvent vehicle the pigment will be uniformly disseminated through the vehicle as a substantially permanent colloidal dispersion.

7. The process of dispersing pigments, which comprises agglutinating the pigment with a "medium" soluble in a solvent vehicle, subjecting the resulting mass to vigorous mechanical manipulation while said mass is in the condition of a highly viscous plastic of "leather-like" consistency until the pigment aggregates are reduced to ultimate fineness and uniformly disseminated throughout the mass as a substantially permanent colloidal dispersion, breaking up the mass and dissolving the "medium" from about the pigment.

8. A pigment preparation comprising a pigment uniformly disseminated throughout a mass of "media" adapted to be readily dissolved in a solvent vehicle, the dissemination having been effected by agglutinating the pigment with the "media" and subjecting the resulting mass to vigorous mechanical manipulation while said mass is in the condition of a highly viscous plastic of "leather-like" consistency until the pigment aggregates are reduced to ultimate fineness and uniformly disseminated throughout the mass as a substantially permanent colloidal dispersion.

9. A dry paint base prepared by the process comprising initially agglutinating or massing a pigment with a "medium" and then subjecting the resulting mass to vigorous mechanical manipulation while said mass is in the condition of a highly viscous plastic of "leather-like" consistency.

WILLIAM BRYAN WIEGAND.